(12) United States Patent
Willis et al.

(10) Patent No.: US 7,371,014 B2
(45) Date of Patent: May 13, 2008

(54) MONOLITHIC ACTIVE OPTICAL CABLE ASSEMBLY FOR DATA DEVICE APPLICATIONS AND VARIOUS CONNECTOR TYPES

(75) Inventors: Thomas G. Willis, Portland, OR (US); Sylvia Downing, El Dorado Hills, CA (US); George Hayek, El Dorado Hills, CA (US); Jesse Chin, Saratoga, CA (US); William H. Wang, Pleasanton, CA (US); Darren S. Crews, Santa Clara, CA (US); Brian H. Kim, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/507,847

(22) Filed: Aug. 21, 2006

(65) Prior Publication Data

US 2008/0044141 A1 Feb. 21, 2008

(51) Int. Cl.
G02B 6/36 (2006.01)
(52) U.S. Cl. .............. 385/89; 385/24; 385/53; 385/58; 385/88; 398/66; 398/135
(58) Field of Classification Search .............. 398/66, 398/135; 385/88–89, 24, 40–41
See application file for complete search history.

(56) References Cited

U.S. PATENT DOCUMENTS 5,040,868 A 8/1991 Waitl et al.
5,708,743 A 1/1998 DeAndrea et al.
5,825,949 A * 10/1998 Choy et al. .............. 385/24

(Continued)

FOREIGN PATENT DOCUMENTS

EP 1048965 A2 11/2000

(Continued)

OTHER PUBLICATIONS

EMCORE, "QTR3400 & QTR3432 4-Channel Media Converters", Product Brief, Dec. 2004. (2 pages) Retrieved from: http://www.emcore.com/assets/fiber/pb.QTR3400_ &_ QTR3432.2004-12-12.Emcore.pdf.

(Continued)

*Primary Examiner*—Brian Healy
*Assistant Examiner*—Guy G Anderson
(74) *Attorney, Agent, or Firm*—Blakely, Sokoloff, Taylor & Zafman LLP

(57) ABSTRACT

A monolithic cable assembly includes a communication cable and cable connectors coupled to either end of the communication cable. The communication cable includes at least one optical communication channel. The cable connectors include a physical end connector for electrically coupling to a data device connector, optoelectronic components for converting data signals between an electrical realm and an optical realm, and a passively aligned integrated lens cover. The integrated lens cover includes at least one optical pathway for coupling optical data signals between the at least one optical communication channel and the optoelectronic components.

25 Claims, 12 Drawing Sheets

U.S. PATENT DOCUMENTS

| | | |
|---|---|---|
| 6,206,578 B1 | 3/2001 | Shin et al. |
| 6,729,774 B1 | 5/2004 | Rast et al. |
| 6,975,784 B1 | 12/2005 | Xu et al. |
| 2003/0138219 A1 | 7/2003 | O'Toole et al. |
| 2005/0196109 A1 | 9/2005 | Kim et al. |
| 2006/0056779 A1 | 3/2006 | Wang |
| 2006/0067064 A1 | 3/2006 | Crews et al. |
| 2006/0067630 A1* | 3/2006 | Kim ............................ 385/88 |
| 2006/0067631 A1 | 3/2006 | Wang et al. |
| 2006/0067684 A1 | 3/2006 | Kim et al. |
| 2006/0067690 A1* | 3/2006 | Tatum et al. ................. 398/66 |
| 2006/0127012 A1 | 6/2006 | Barbarossa et al. |
| 2006/0133820 A1 | 6/2006 | Wang et al. |
| 2006/0133821 A1 | 6/2006 | Wang et al. |
| 2006/0140572 A1 | 6/2006 | Ruiz |
| 2006/0147159 A1 | 7/2006 | Chang et al. |
| 2006/0147214 A1* | 7/2006 | Ruiz et al. .................. 398/135 |

FOREIGN PATENT DOCUMENTS

EP            1048965 A3     12/2000

OTHER PUBLICATIONS

OPTICIS, "Point to Point Hybrid Cable: M1-1P0H", 2005. (1 page) Retrieved from: http://www.opticis.com/product_hdmi_02.htm.

OPTICIS, "Point to Point Hybrid Cable: M1-1P0", 2005. (1 page) Retrieved from: http://www.opticis.com/product_31.htm.

OPTICIS, "Express All-Fiber: M1-1000 (upgraded version of M1-100)", 2005. (1 page) Retrieved from: http://www.opticis.com/product_3.htm.

OPTICIS, "M2-100/210/10S/21S (Ver. 2.3)", Data Sheet, Aug. 3, 2005. (1 page) Retrieved from: http://www.opticis.com/product_hdmi_02.htm.

Fujitsu Component Limited, "o-microGiGaCN™ ", Data Sheet Revision 4.2, Jun. 22, 2005. (13 pages) Retrieved from: http://www.fcai.fujitsu.com/pdf/o-MGC_OpticalTranceiverModule.pdf.

Network Technologies Incorporated, "DVI-D Fiber Optic Extension Cable", Data Sheet, 2006. (1 page) Retrieved from: http://www.ntil.com/pdf/cat-dvi-fiber-cable.pdf.

* cited by examiner

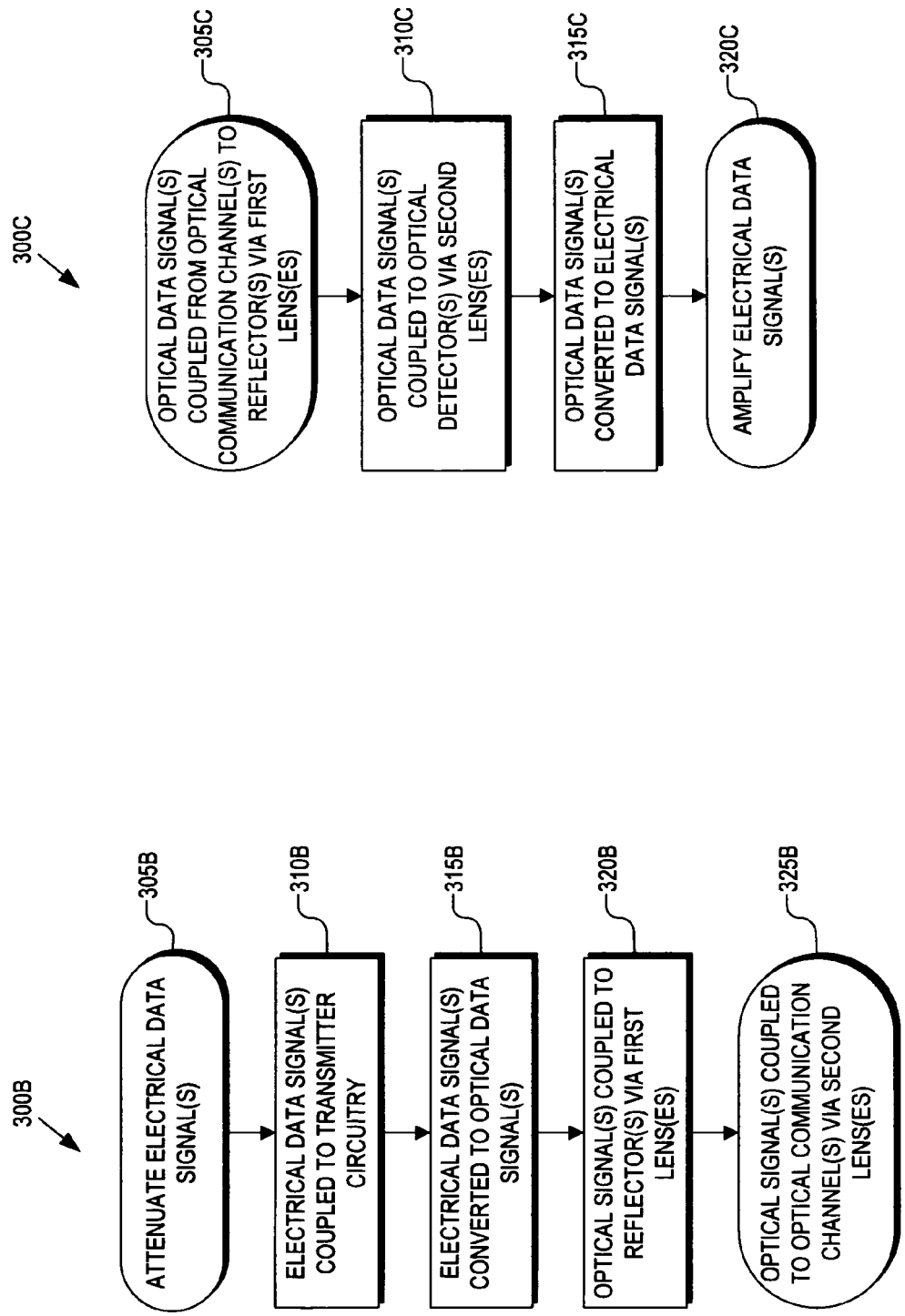

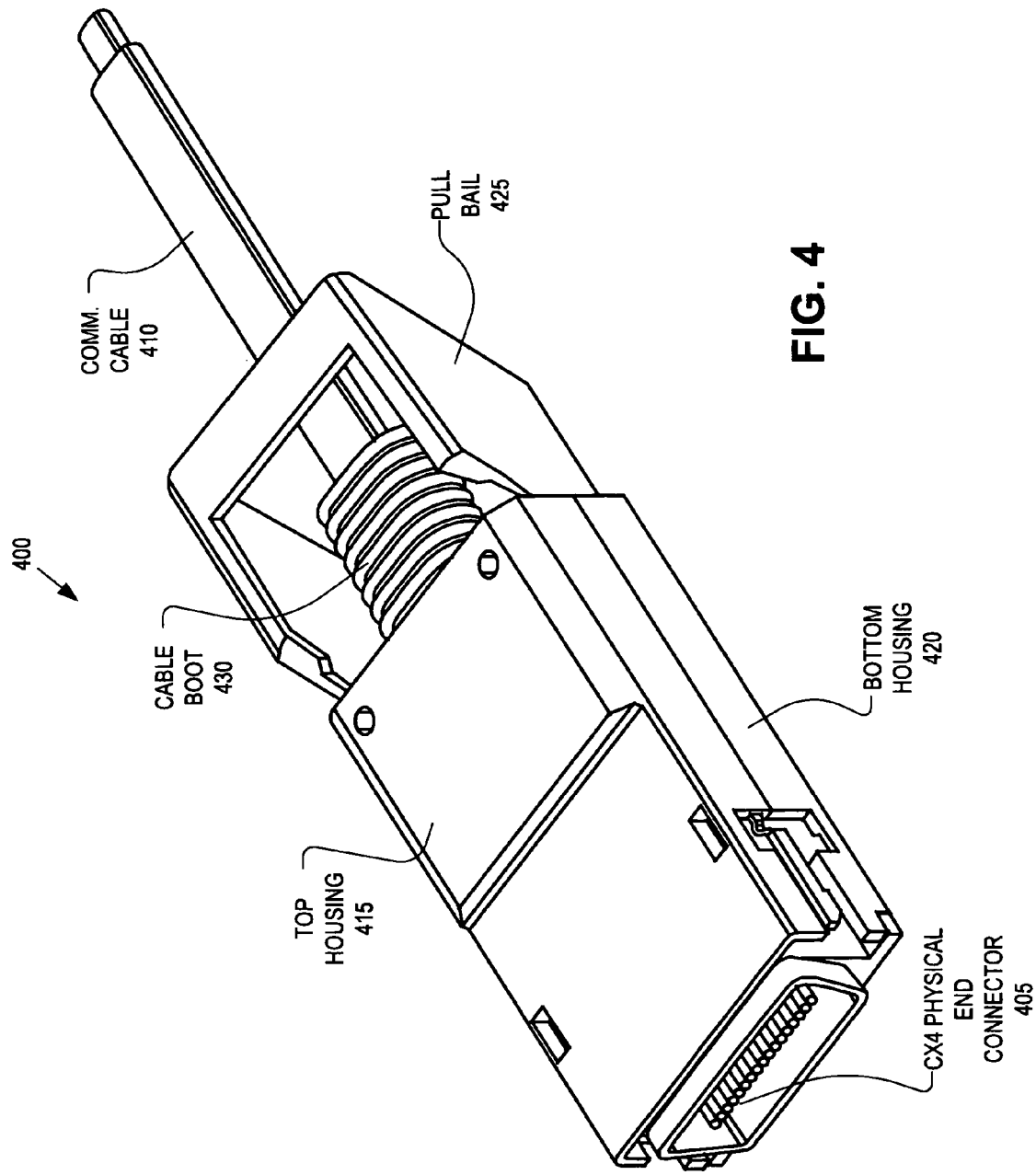

MONOLITHIC ACTIVE OPTICAL CABLE ASSEMBLY FOR DATA DEVICE APPLICATIONS AND VARIOUS CONNECTOR TYPES

TECHNICAL FIELD

This disclosure relates generally to cable assemblies, and in particular, but not exclusively, relates to monolithic active optical cable assemblies for data device applications and various connector types.

BACKGROUND INFORMATION

Over the past several decades, both the business and science communities have employed client-server architectures to sufficiently meet their application processing requirements. As the applications become more and more complex, the need for more powerful servers to run the applications has increased. For example, more powerful servers enable more accurate and more rapid scientific calculations and simulations. In addition, it is often desirable to run the more complex applications, or at least the complex parts of applications, on a powerful server, while running the simpler applications on a client computer. For example, internet search companies run complex search filters on remote servers, while the results are displayed on the users' PCs using simpler display programs.

Over the last ten years, and especially in the last five years, clusters of large numbers of simple servers have emerged as a leading solution for high powered servers. Sometimes these clusters comprise hundreds or even thousands of servers. Many of the servers and switches in these clusters are connected by cables, predominantly copper cables. For example, each blade server in the datacenter may have three different cables attached to it—one for management purposes (typically Gigabit Ethernet cable), one for storage, and one for CPU-to-CPU interconnects (increasingly Infiniband cable). This copper cabling is extremely heavy and has a large cross section, thus consuming a vast amount of space in the small datacenters. The copper cabling is also mechanically temperamental. Because of its heavy weight, copper cabling places stress on the connectors. Therefore, if somebody accidentally bumps into a cable, it can stop working. Additionally, the copper cabling has a long bend radius, thus reducing flexibility.

Furthermore, copper cable simply cannot perform effectively over long distances at high data rates. As data rates increase, the span of copper cable over which an electrical signal may propagate while incurring tolerable degradation is decreasing. Currently, at 20 Gbps, electrical signals can only travel about 10 meters over copper cable before the signal degrades beyond tolerable limits.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 3B is a flow chart illustrating a process of converting an electrical data signal to an optical data signal within a cable connector of a monolithic cable assembly, in accordance with an embodiment of the invention.

FIG. 3C is a flow chart illustrating a process of converting an optical data signal to an electrical data signal within a cable connector of a monolithic cable assembly, in accordance with an embodiment of the invention.

FIG. 4 is a perspective view illustrating a cable connector of a monolithic cable assembly, in accordance with an embodiment of the invention.

DETAILED DESCRIPTION

Embodiments of an apparatus, method, and system for a monolithic active optical cable assembly for data device applications and various connector types are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Figure 1:
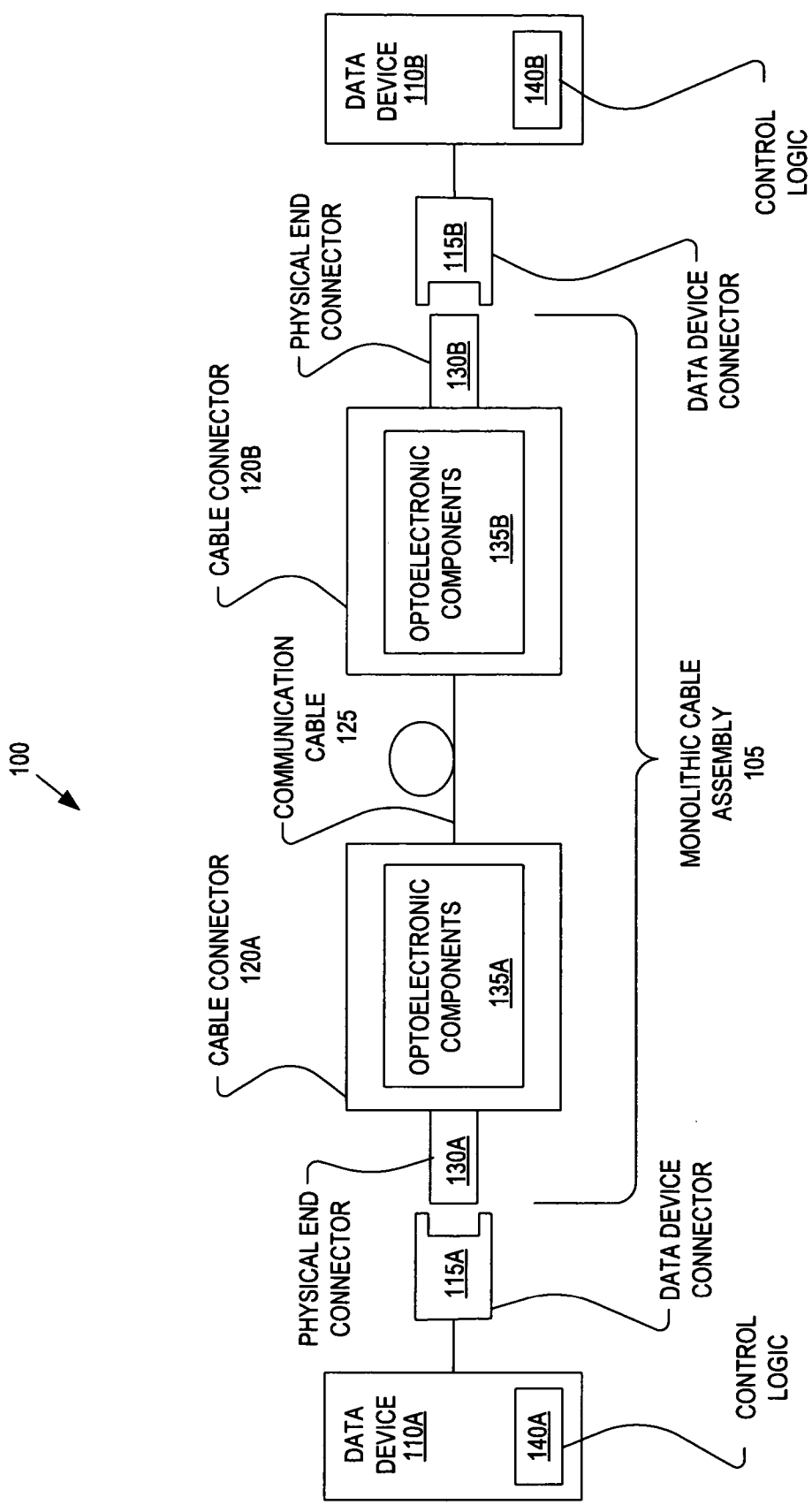
FIG. 1 is a functional block diagram illustrating an optical interconnect system implemented with a monolithic cable assembly, in accordance with an embodiment of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular fea- FIG. 1 is a functional block diagram illustrating an optical interconnect system 100 implemented with a monolithic cable assembly 105, in accordance with an embodiment of the invention. The illustrated embodiment of optical interconnect system 100 includes data devices 110A and 110B (collectively 110), data device connectors 115A and 115B (collectively 115), and a monolithic cable assembly 105. The illustrated embodiment of monolithic cable assembly 105 includes cable connectors 120A and 120B (collectively 120) and a communication cable 125. The illustrated embodiment of cable connectors 120 includes physical end connectors 130A and 130B (collectively 130) and optoelectronic components 135A and 135B (collectively 135). The illustrated embodiment of data devices 110 includes control logic 140A and 140B (collectively 140).

In one embodiment, monolithic cable assembly 105 is a monolithic active optical cable assembly. The components of monolithic cable assembly 105 are not easily separable by an end user and as such the end user views monolithic cable assembly 105 as a contiguous, sealed unit. The lack of a user-accessible optical interface eliminates a potential source of failure, thus making monolithic cable assembly 105 more reliable. The monolithic nature of monolithic cable assembly 105 also prevents user exposure to potentially hazardous laser light, thus potentially enabling the use of higher optical power for optical communication, without need to comply with laser eye safety standards.

Data devices 110 may include any device that sends and/or receives data signals, including computing, communication, entertainment, radio frequency ("RF"), data acquisition devices, or the like. In one embodiment, data devices 110 may be chips on a single circuit board or on different circuit boards. Monolithic cable assembly 105 may interface with existing data devices and may function as a plug-in replacement for copper cable. Because monolithic cable assembly 105 may be compatible with existing data device connectors, end users may choose to use monolithic cable assembly 105 having integrated active optical components or a standard copper cable to interconnect existing data devices without being required to swap out all their existing data device connectors for use with optical cables. It should be appreciated that monolithic cable assembly 105 may be adapted for use in conjunction with a wide variety of data device applications and interconnects. Table 1 lists a few of the data device applications and interconnects that may be implemented for use with monolithic cable assembly 105, in accordance with various embodiments.

TABLE 1

| Application/Interconnect | Brief Description |
|---|---|
| Blade-to-Blade Interconnect | Connecting two blade PCs or servers |
| Chip-to-Chip Interconnect | Connecting two chips on different boards or on the same board |
| CPU-to-CPU Interconnect | Connecting multiple CPUs to each other |
| CPU-to-Memory Interconnects | Connecting a CPU to memory (including semiconductor memory and other types of storage) |
| CPU-to-Graphics Chip Interconnect | Connecting a CPU to one or more graphics chips |
| Input/Output ("I/O") Interconnect | Connecting input or output devices to other data devices |
| Optical Backplane Interconnect | Utilizing optical backplanes rather than copper backplanes |
| Data Acquisition Application | Acquiring data from peripheral devices and sensors |
| RF Application | Analog radio frequency signals over optical fibers |
| CATV Interconnect | Cable TV Interconnect |
| Ethernet Interconnect | Networking interconnect including 1 Gbps, 10 Gbps, and power over Ethernet applications |
| Infiniband Interconnect | High-speed serial computer bus intended for both internal and external connections; usually used for CPU-to-CPU interconnects; supports 1X, 4X and 12X cabling |
| Myrinet Interconnect | High-speed LAN system to be used as an interconnect between multiple machines to form computer clusters |
| QsNet Interconnect | High-speed interconnect used in high performance computer clusters |
| Virtualization of Multiple I/O Streams Application | Process of presenting a logical grouping or subset of computing resources so that they can be accessed in ways that give benefits over the original configuration |
| Serial Advanced Technology Attachment ("SATA") Interconnect | Computer bus technology primarily designed for transfer of data to and from a hard disk |
| Serial Advanced Small Computer System Interface ("SAS") Interconnect | Serial communication protocol for devices designed to allow for much higher speed data transfers and is compatible with SATA |
| Internet Small Computer System Interface ("iSCSI") | Data transfer over TCP/IP networks using SCSI protocol |
| Fibre Channel Interconnect | Multi Gigabit speed network technology primarily used for storage networking; can run on both copper wire and fiber optic cables; five-layer protocol |
| Peripheral Component Interconnect Express ("PCIe") | Implementation of PCI computer bus; typically used as a local interconnect; link built around a bidirectional, serial, point-to-point connection |
| Advanced Switching Interconnect ("ASI") | Provides a single, flexible, common standard-based switching solution that can be used to solve a wide variety of port-to-port, processor-to-processor and processor-to-I/O device connections in backplane, board-to-board and fabric designs |
| Common System Interface ("CSI") Interconnect | New processor interconnect standard being produced by Intel |
| HyperChannel | Processor interconnect standard produced by AMD |

Data device connectors 115 couple existing data devices 110 to physical end connectors 130 of cable connectors 120. Data device connectors 115 may be physically integrated into data devices 110 or externally coupled thereto. In the illustrated embodiment, data device connectors 115 are electrical sockets that mate with electrical plugs (physical end connectors 130). It should be appreciated that alternative embodiments may include data device connectors 115 as electrical plugs and physical end connectors 130 as electrical sockets. The illustrated embodiment depicts control logic 140 within data devices 110. However, it should be appreciated that control logic 140 may be externally coupled to data devices 110.

Figure 2A:
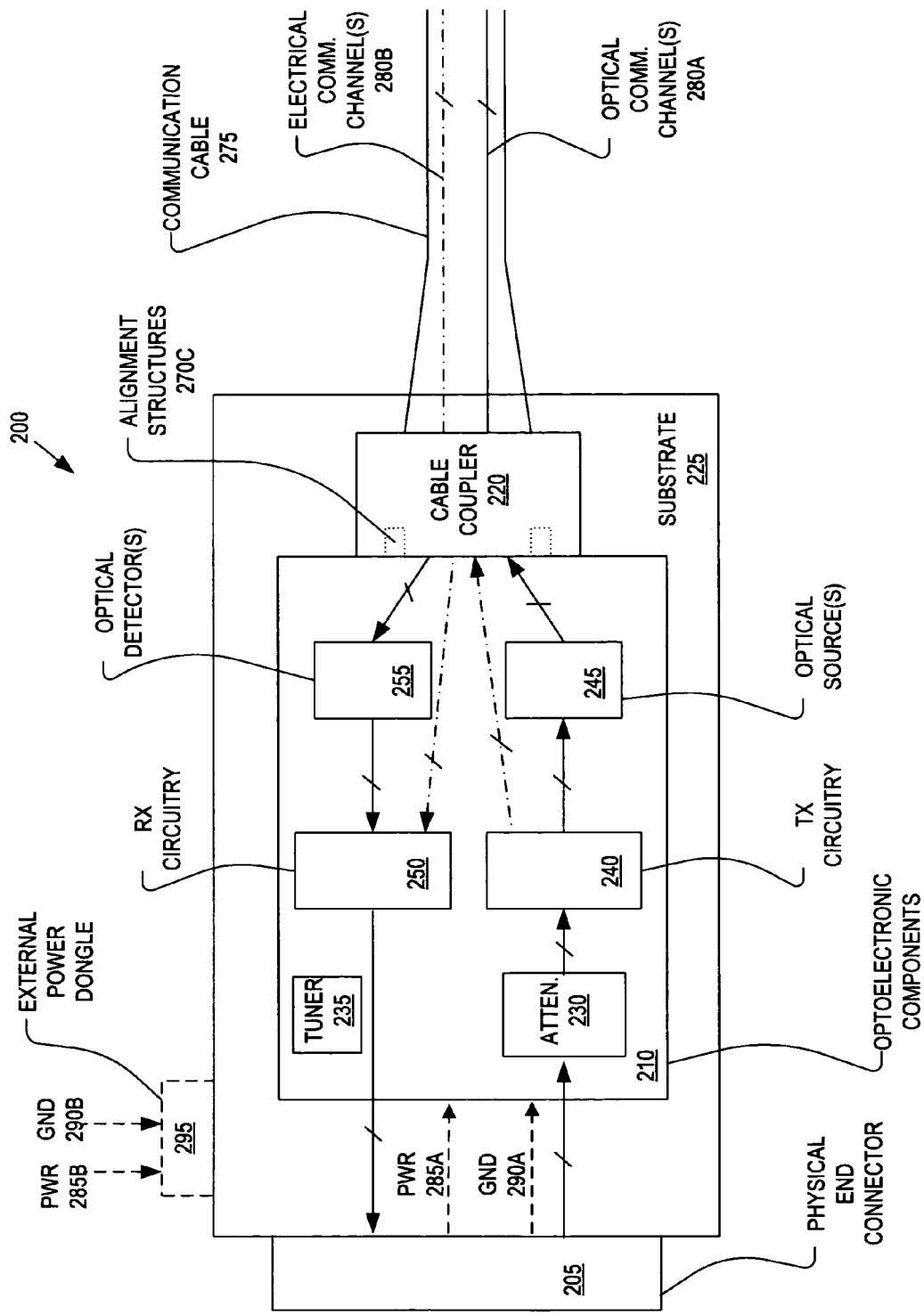
FIG. 2A is a plan view functional block diagram illustrating a cable connector of a monolithic cable assembly, in accordance with an embodiment of the invention.
Figure 2B:
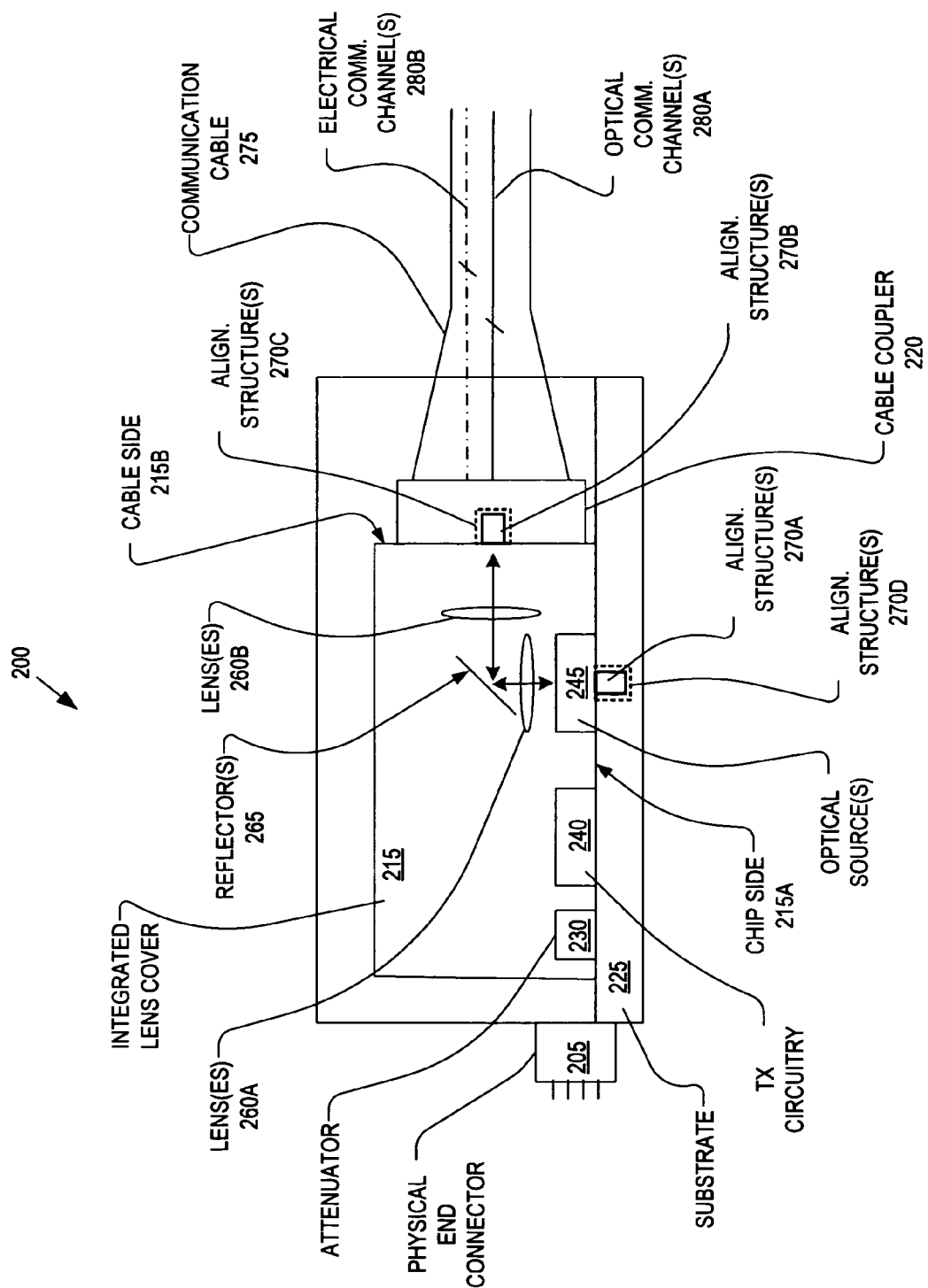
FIG. 2B is a side view functional block diagram illustrating a cable connector of a monolithic cable assembly, in accordance with an embodiment of the invention.

FIGS. 2A and 2B are functional block diagrams illustrating a cable connector 200, in accordance with an embodiment of the invention. FIG. 2A is a plan view of cable connector 200 and FIG. 2B is a side view of the same. Cable connector 200 is one possible embodiment of cable connector 120A or 120B illustrated in FIG. 1. It should be appreciated that the figures are not illustrated to scale, but are merely functional block diagrams for illustration.

The illustrated embodiment of cable connector 200 includes a physical end connector 205, optoelectronic components 210, an integrated lens cover 215 (see FIG. 2B), a cable coupler 220, and a substrate 225. In one embodiment, cable connector 200 may also include a microcontroller to calibrate optoelectronic components 210.

The illustrated embodiment of optoelectronic components 210 includes an attenuator 230, a tuner 235, transmitter circuitry 240, an optical source array 245, receiver circuitry 250, and an optical detector array 255. The illustrated embodiment of integrated lens cover 215 includes a lens array 260A, a lens array 260B, a reflector array 265, alignment structures 270A, and alignment structures 270B. The illustrated embodiment of cable coupler 220 includes alignment structures 270C. The illustrated embodiment of substrate 225 includes alignment structures 270D.

Cable coupler 220 couples cable connector 200 to a communication cable 275. The illustrated embodiment of communication cable 275 comprises an array of optical communication channels 280A and an array of electrical communication channels 280B. It should be appreciated that optical communication channels 280A and electrical communication channels 280B may include zero or more channels. Thus, in one embodiment, communication cable 275 may not include electrical communication channels 280B. Furthermore, optical communication channels 280A and electrical communication channels 280B may be bidirectional or unidirectional. In one embodiment, a single optical communication channel may provide bidirectional optical communication.

Optical communication channels 280A may be any waveguide that directs one or more optical data signals from one place to another in one or more directions. In one embodiment, optical communication channels 280A may be an array of optic fibers bundled together to provide flexible optical routing paths between data devices 110. Electrical communication channels 280B may be fabricated from any conductive material, such as copper.

In the illustrated embodiment, optoelectronic components 210 are mounted on substrate 225 (e.g., printed circuit board). Substrate 225 may include one or more leads to electrically couple physical end connector 205 to optoelectronic components 210. Optoelectronic components 210 may be bare die components without chip packages in one embodiment. Attenuator 230 may reduce the amplitude of high-power electrical signals if necessary. In one embodiment, attenuator 230 is a passive device made from resistors. The amount of attenuation may be fixed, continuously adjustable, or incrementally adjustable. In the illustrated embodiment, attenuator is depicted as a separate optoelectronic component. However, in some embodiments, attenuator may be included within transmitter circuitry 240 or included elsewhere. Tuner 235 may be used to vary the data rate to provide flexibility. In one embodiment, tuner 235 is a capacitor.

Transmitter circuitry 240 and receiver circuitry 250 may be bare die integrated circuits mounted on substrate 225, and may include a variety of electronic sub-circuits. In various embodiments, transmitter circuitry 240 and receiver circuitry 250 include a transimpedance amplifier ("TIA"), drivers, buffers, and/or logic elements. Transmitter circuitry 240 and receiver circuitry 250 may further include a serializer/deserializer ("SERDES") to serialize and deserialize electrical data signals.

Optical source array 245 and optical detector array 255 may be bare die active optical devices mounted on substrate 225. Optical source array 245 and optical detector array 255 may each be physically integrated into a single monolithic array die. It should be appreciated that optical source array 245 and optical detector array 255 may include one or more optical sources or optical detectors, respectively, in accordance with various embodiments.

Optical source array 245 may include a directly modulated laser, a constant wave source with an external modulator, an array of vertical-cavity surface-emitting lasers ("VCSELs"), an array of light emitting diodes ("LEDs"), or the like. Optical detector array 255 may include an array of photodetectors, such as PIN photodiodes, avalanche photodiodes, or the like.

A variety of techniques may be used to provide power to optoelectronic components 210. In one embodiment, physical end connector 205 may include at least one internal power pin to provide power to optoelectronic components 210. In accordance with this embodiment, data devices 110 may choose to provide power based on a determination by control logic 140 that data devices 110 are coupled to an active optical cable such as monolithic cable assembly 105 versus a standard electrical cable. The illustrated embodiment includes a power line 285A and a ground line 290A coupled to optoelectronic components 210 via physical end connector 205. In other embodiments, cable connector 200 may include an external power dongle 295 which provides power 285B and ground 290B to optoelectronic components 210 (illustrated with dotted lines to represent alternative embodiments within the same figure).

In some embodiments, data devices 110 may communicate electronic data signals modulated over a direct current ("DC") power signal via one or more internal power pins, thus utilizing the same pins for multiple purposes. Physical end connector 205 may further provide power to a second cable connector coupled to cable connector 200 via one of electrical communication channels 280B. Electrical communication channels 280B may also communicate both power and an electrical data signal on electrical communication channels 280B by modulating the electrical data signal on the power signal. For example, data device 110A may power optoelectronic components 135A of cable connector 120A as well as optoelectronic components 135B of cable connector 120B via electrical communication channels 280B.

In one embodiment, integrated lens cover 215 is molded plastic (e.g., ultem) created by a process of injection molding. In one embodiment, lens array 260A, lens array 260B, and reflector array 265 are all embedded or integrally formed into integrated lens cover 215. The illustrated embodiments of lens array 260A, lens array 260B, and reflector array 265 may include one instance of each element corresponding to each of optical communication channels 280A. Each reflector in reflector array 265 may be a reflective plane placed at 45 degree angle relative to lens array 260A and lens array 260B. In one embodiment, the reflectors are total internal reflection mirrors.

The illustrated embodiment of integrated lens cover 215 further includes alignment structures 270A disposed on a chip side 215A of integrated lens cover 215 and alignment structures 270B disposed on a cable side 215B of integrated lens cover 215. The illustrated embodiment of cable coupler 220 includes alignment structures 270C disposed in one side of cable coupler 220. It should be appreciated that alignment structures 270A, 270B, 270C, and 270D (collectively 270) may include any number of structures and may be any size or shape. It should also be appreciated that although alignment structures 270A and 270B are alignment pins and alignment structures 270C and 270D are alignment holes in the illustrated embodiment, alternative embodiments may include alignment structures 270A and 270B as alignment holes and alignment structures 270C and 270D as alignment pins.

Collectively, alignment structures 270 optically align optoelectronic components 210 with optical communication channels 280A in a passive manner. It should be appreciated that cable connector 200 incorporates alignment structures in three or more planes in one embodiment. In another embodiment, passive alignment of curved surfaces is achieved by moving alignment structures 270 some number of degrees away from one another. Alignment structures 270 may provide passive alignment by physical fit (e.g. pushing into place) and/or visual cues (e.g. machine vision placing devices by reading physical cues). Passive alignment is discussed in greater detail in conjunction with FIGS. 6-9.

Passive alignment allows optoelectronic components 210, cable coupler 220, and integrated lens cover 215 to be plugged into place without aid of active alignment techniques. Passive alignment also makes cable connector 200 amenable to high volume manufacturing because of reduced fabrication costs. The design further enables easy adaptation for compliance with a variety of physical connector types. The overall structure of monolithic cable assembly 105 and cable connector 200 may remain the same, with the optoelectronic components being altered to support different numbers of optical and electrical communication channels and different data rates according to various physical connector types. Physical end connector 205 can be adapted to be compliant with a variety of physical connector types, as listed in Table 2. Note: Table 2 is not intended to be an exhaustive list.

TABLE 2

| Connector Type | Brief Description |
| --- | --- |
| CX4 Connector | Connects servers and switches over short distances; often used with Infiniband cable and 10Gb Ethernet; supports 4 pairs of twinaxial cable |
| CX12 Connector | Supports 12 pairs of twinaxial cable |
| MicroGiGaCN Connector | Differential connector for high-speed data transfer of 20 m or less |
| LaneLink Connector | 4X and 12X connectors for cable to board I/O optimized for differential signaling at and above 2.5 Gbps per pair |
| MDI Connector | Medium dependent interface connector; Ethernet port connector that allows network hubs or switches to connect to other hubs or switches without a null modem or crossover cable |
| X2 Connector | 10 Gigabit Ethernet network physical access connector which has four full duplex channels for a 10 Gigabyte attachment unit interface ("XAUI"); industry standard 70 pin connector; |
| XPAK Connector | 10 Gigabit Ethernet network physical access connector which has four full duplex channels for a 10 Gigabyte attachment unit interface ("XAUI"); industry standard 70 pin connector |
| XENPAK Connector | 10 Gigabit Ethernet network physical access connector which has four full duplex channels for a 10 Gigabyte attachment unit interface ("XAUI"); industry standard 70 pin connector |
| SFP Connector | Small form factor pluggable connector that interfaces a network device mother board with a networking cable using a small form factor connector |
| SFP Plus ("SFP+") Connector | 10 Gigabit small form factor pluggable connector |
| XFP Connector | 10 Gigabit small form factor pluggable connector used in telecom routing |
| QSFP Connector | Quad small form factor pluggable connector |
| SATA Connector | Serial Advanced Technology Attachment connector; primarily designed for transfer of data to and from a hard disk; supports cable with 7 conductors |
| SAS Connector | Serial attached SCSI connector; used for point-to-point high speed data transfer; compatible with SATA |
| MiniSAS Connector | Serial attached SCSI connector; used for point-to-point high speed data transfer, especially in server storage systems |
| Display Port Connector | Supports 1 to 4 data pairs at main link that also carries audio and clock signals with transfer rate of 1.62 or 2.7 Gbps |

TABLE 2-continued

| Connector Type | Brief Description |
| --- | --- |
| UDI external Connector | Unified display interface connector; designed for HDTV and PC usage; replaces aging VGA analog interface; provides higher bandwidth than previous digital ports |
| RJ-45 Connector | Registered Jack 45 connector; used for terminating twisted pair type cables, especially Ethernet cables; 8 pin connector |
| SNAP 12 MSA | 12-channel pluggable connector |
| 100 pin matrix array connector | Multiple pin matrix array connector |
| Optocube | 12-channel parallel optical module; used for rack-to-rack and shelf-to-shelf interconnects |
| COAX connectors | Coaxial cable connectors for copper cable |

Figure 3A:
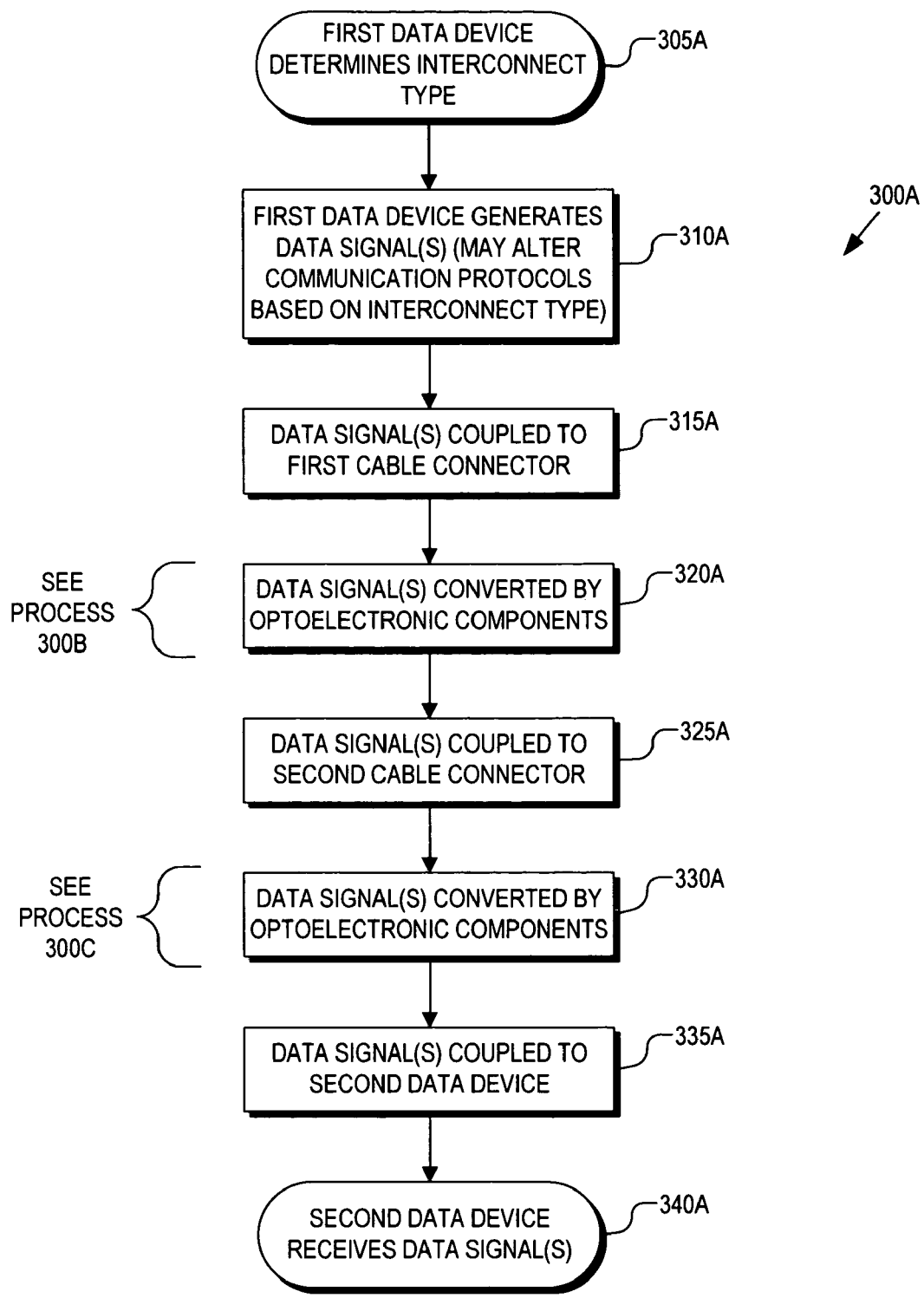
FIG. 3A is a flow chart illustrating a process for communicating electrical data signals between data devices over an optical interconnect system implemented with a monolithic cable assembly, in accordance with an embodiment of the invention.

FIG. 3A is a flow chart illustrating a process 300A for communicating electrical data signals between data devices 110 over monolithic cable assembly 105, in accordance with an embodiment of the invention. Process 300A is described below with reference to FIGS. 1, 2A, and 2B. The order in which some or all of the process blocks appear in each process should not be deemed limiting. Rather, one of ordinary skill in the art having the benefit of the present disclosure will understand that some of the process blocks may be executed in a variety of orders not illustrated.

In a process block 305A, data device 110A determines which type of cable assembly is connected to data device connector 115A. For instance, the cable assembly may be a standard electrical cable assembly or monolithic cable assembly 105 having integrated active optical components. A variety of techniques may be used to determine the type of cable assembly, including, but not limited to, at least one extra pin in data device connector 115A, a low speed interface such as an inter-integrated circuit ("I2C") interface or a Management Data Input/Output ("MDIO") interface, an initial control signal from high-speed data signaling lanes, and load detection on any pin in data device connector 115A. In one embodiment, this sensory determination may be accomplished via control logic 140A within data device 110A. It should be appreciated that data device 110B may also be capable of performing process block 305A via control logic 140B.

In a process block 310A, data device 110A generates electrical data signals for transmission to data device 110B. In one embodiment, control logic 140A changes or alters communication protocols based on whether an active optical cable having active optoelectronic components such as monolithic cable assembly 105 or a standard electrical cable is connected to data devices 110. It should be appreciated that control logic 140B within data device 110B may also change its communication protocols as well. Changing the communication protocol may include changing the level, format, and/or number of the electrical and/or optical data signals to optimize electrical and/or optical transmission. Changing the communication protocol may further include repurposing connector pins with different signals or using entirely different pins. Repurposing pins may include using the same pins for multiple purposes depending on the type of cable connected to data devices 110. Using entirely different pins may mean that some pins are "turned on" when one type of cable is connected, but "turned off" when another type of cable is connected.

In a process block 315A, the electrical data signals are coupled to cable connector 120A via the combination of data device connector 115A and physical end connector 130A. In a process block 320A, optoelectronic components 135A convert some or all of the electrical data signals into optical data signals. It should be appreciated that a portion of the electrical data signals may not be converted into optical data signals. Examples of electrical data signals that may not be converted include slow speed electrical data signals not well suited for optical transmission, such as clock signals. The unconverted electrical data signals may be electrically coupled to/from electrical communication channels 280B from/to transmitter circuitry 240 and receiver circuitry 250 (see FIG. 2A).

In a process block 325A, the electrical and optical data signals are coupled to cable connector 120B via communication cable 125. Optical data signals may travel over optical communication channels 280A, while electrical data signals that were not converted to optical data signals may travel over electrical communication channels 280B. In one embodiment, the electrical and optical data signals may be digital, multi-level and/or analog data signals.

In a process block 330A, the optical data signals are converted back to electrical data signals by optoelectronic components 135B. It should be appreciated that these electrical data signals correspond to the electrical data signals generated by data device 110A. In a process block 335A, the electrical data signals are coupled to data device 110B via physical end connector 130B and data device connector 115B. Finally, in a process block 340A, data device 110B receives the electrical data signals.

FIG. 3B is a flow chart illustrating a process 300B of converting electrical data signals to optical data signals within cable connector 120A of monolithic cable assembly 105, in accordance with an embodiment of the invention. Process 300B is an expansion of process block 320A (see FIG. 3A).

Because monolithic cable assembly 105 is a plug-in replacement for copper cable, data devices 110 generate high-power electrical data signals as if they were connected to a standard copper cable. In a process block 305B, the high-power electrical data signals are attenuated via attenuator 230 (see FIG. 2A). It should be appreciated that some electrical data signals may not require attenuation. For example, if data devices 110 have the capability to alter the electrical data signals that they generate based on the determination that they are connected to an active optical cable assembly, attenuation may not be required. In a process block 310B, the electrical data signals are coupled to transmitter circuitry 240. In one embodiment, transmitter circuitry 240 multiplexes two or more parallel electrical data signals into one or more serial streams via a serializer. Transmitter circuitry 240 may also enable wavelength-division multiplexing ("WDM") to transmit different wavelengths over a single optical communication channel 280A. WDM may further enable bidirectional communication over a single optical communication channel 280A. The multiplexing may also be accomplished via multi-level signaling. In a process block 315B, the electrical data signals are converted to optical data signals by optical source array 245.

In a process block 320B, the optical data signals are coupled from optical source array 245 to reflector array 265 via lens array 260A (see FIG. 2B). Finally, in a process block 325B, the optical data signals are coupled to optical communication channels 280A via lens array 260B. It should be appreciated that other optical pathways may be incorporated in other embodiments. For example, a curved reflector may be used to couple the optical data signals from optical source array 245 to optical communication channels 280A, thus eliminating the need for lens arrays 260A and 260B. In addition, substrate 225 may be rotated ninety degrees so that the optical data signals can travel in a straight line directly from optical source array 245 to optical communication channels 280A, thus eliminating the need for reflector array 265.

FIG. 3C is a flow chart illustrating a process 300C of converting an optical data signal to an electrical data signal within cable connector 200 of a monolithic cable assembly, in accordance with an embodiment of the invention. Process 300C is an expansion of process block 330A (see FIG. 3A).

In a process block 305C, optical data signals are coupled from optical communication channels 280A to reflector array 265 via lens array 260B. In a process block 310C, the optical data signals are coupled from reflector array 265 to optical detector array 255 via lens array 260A. It should be appreciated that the alternative embodiments of optical pathways discussed in conjunction with process 300B may be incorporated in process 300C as well. In a process block 315C, the optical data signals are converted to electrical data signals by optical detector array 255. Finally, in a process block 320C, the electrical data signals are amplified. The amplification may occur within receiver circuitry 250. In one embodiment, the re-converted optical data signals may be demultiplexed into their original constituent parts via a deserializer. The deserializer may be a SERDES or a WDM demulitplexer. The deserializer may be used to demultiplex high-speed optical data signals, thus making monolithic cable assembly 105 compliant with lower speed components, such as SFP, XFP, or the like.

Figure 5:
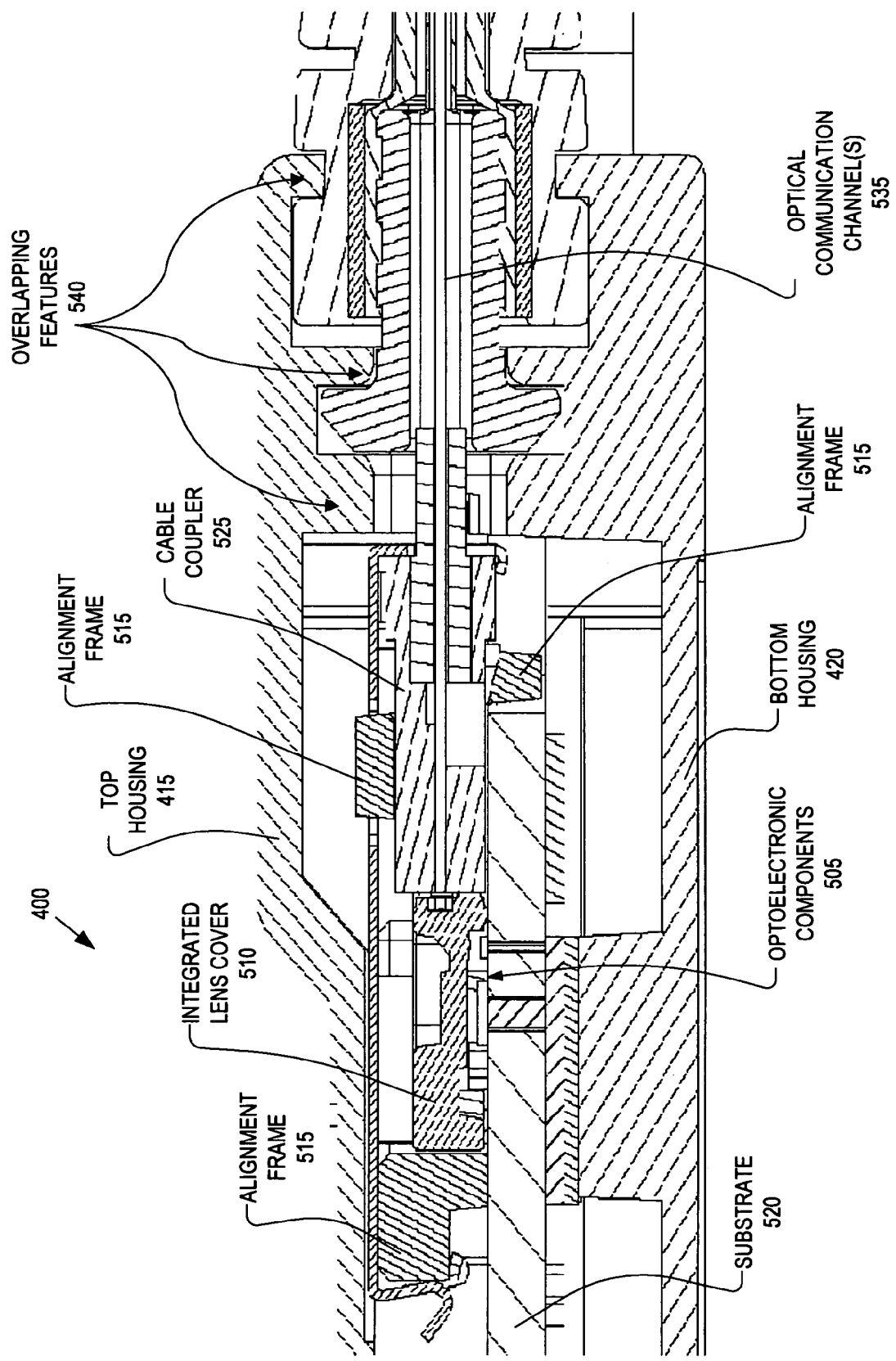
FIG. 5 is a cross-section view illustrating a cable connector of a monolithic cable assembly, in accordance with an embodiment of the invention.
Figure 6:
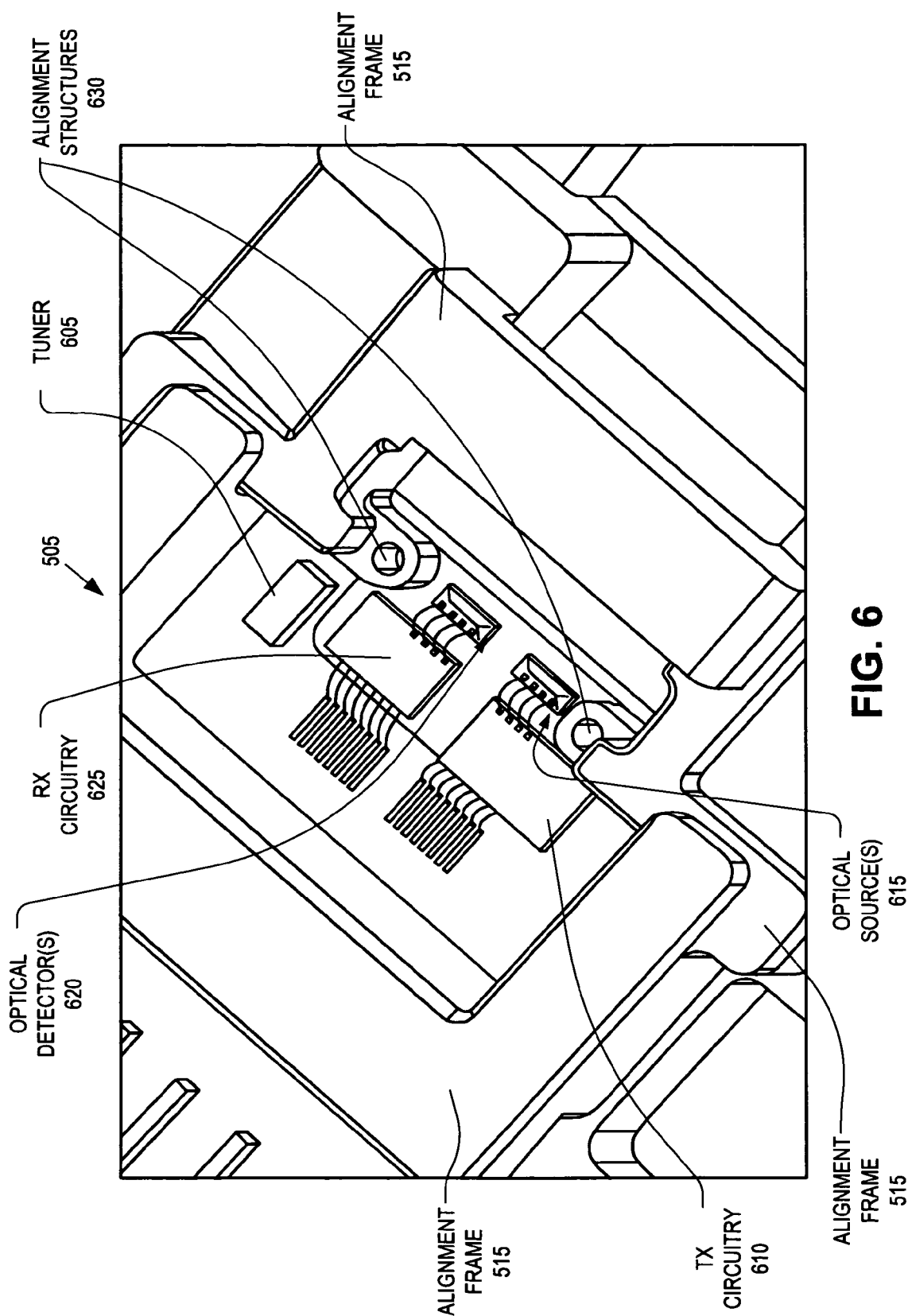
FIG. 6 is a perspective view illustrating optoelectronic components disposed within a cable connector of a monolithic cable assembly, in accordance with an embodiment of the invention.
Figure 7:
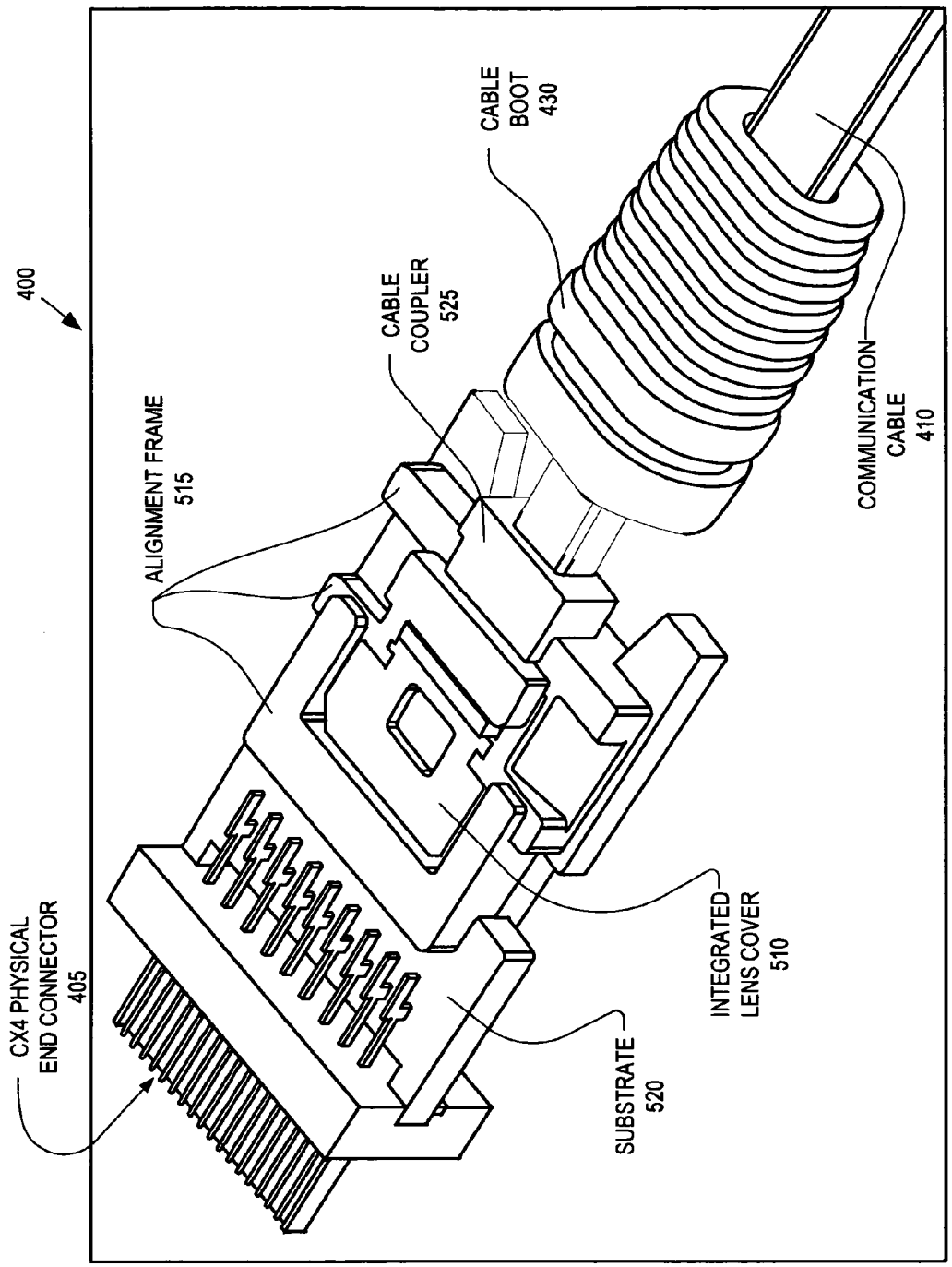
FIG. 7 is a perspective view illustrating a cable connector of a monolithic cable assembly, in accordance with an embodiment of the invention.

FIGS. 4, 5, 6 and 7 all illustrate an example cable connector 400 that is compliant with a CX4 physical end connector 405, in accordance with an embodiment of the invention. Cable connector 400 may be used in conjunction with Infiniband interconnects, as illustrated in Table 1. FIG. 4 is a perspective view illustrating external components of cable connector 400 and a communication cable 410. FIG. 5 is a cross-section view illustrating internal components of cable connector 400 and communication cable 410. FIG. 6 is a perspective view illustrating optoelectronic components 505 disposed within cable connector 400, in accordance with an embodiment of the invention. FIG. 7 is a perspective view of cable connector 400 illustrating an integrated lens cover 510 disposed over at least a portion of optoelectronic components 505. Cable connector 400 is one possible implementation of cable connectors 120 or 200 adapted for a CX4 end connector.

External components of cable connector 400 include a top housing 415, a bottom housing 420, and a pull bail 425. External components of communication cable 410 include a cable boot 430. Internal components of cable connector 400 include optoelectronic components 505, integrated lens cover 510, an alignment frame 515, a substrate 520, and a cable coupler 525. Internal components of communication cable 410 include optical communication channels 535. The illustrated embodiment of optoelectronic components 505 includes a tuner 605, transmitter circuitry 610, an optical source array 615, an optical detector array 620, and receiver circuitry 625. The illustrated embodiment of alignment frame 515 includes alignment structures 630.

In one embodiment, top housing 415 and bottom housing 420 may be composed of metal. In other embodiments, top housing 415 and bottom housing 420 may be fabricated of any rigid material, such as plastic, polymer, or the like. Top housing 415 and bottom housing 420 may serve to protect the internal components of cable connector 400 from physical damage, contamination, temperature, and the like. Top housing 415 and bottom housing 420 may also protect end users from potential eye damage from exposure to unsafe laser light. The illustrated embodiment of top housing 415 and bottom housing 420 further includes overlapping features 540 as seen in FIG. 5. Overlapping features 540 of may prevent leakage of electromagnetic interference ("EMI"). It should be appreciated that only a few of the overlapping features were labeled for clarity. Overlapping features 540 may include any and all overlapping features, in accordance with an embodiment of the invention.

The illustrated embodiment of pull bail 425 may be shorter than on counterpart cable connectors. Pull bail 425 may be used to insert and remove cable connector 400 without risking damage that might be caused by pulling on communication cable 410 directly. The illustrated embodiment of cable boot 430 may provide strain relief for communication cable 410. In some embodiments, communication cable 410 may be several times lighter and may have a smaller bend radius than its counterpart copper cable. In one embodiment, communication cable 410 may include multiple optical communication channels. For example, in accordance with a CX4 Infiniband embodiment, communication cable 410 may include four channels in each direction and four channels for mechanical spacing, making a total of twelve channels.

The illustrated embodiment of alignment frame 515 is a single monolithic unit. Alignment frame 515 may serve multiple alignment purposes. Alignment frame 515 may include a socket to receive and align integrated lens cover 510 and a socket to receive and align cable coupler 525. FIG. 7 illustrates how integrated lens cover 510 and cable coupler 525 fit within alignment frame 515. This provides coarse passive alignment of optoelectronic components 505 to the optical pathway within integrated lens cover 510 and coarse passive alignment of the optical pathway to optical communication channels 535 within communication cable 410. Alignment structures 630 may serve as reference points to accurately place optoelectronic components 505 on substrate 520 including the electrical connections. Similar to alignment structures 270, alignment structures 630 may provide alignment by physical fit and/or by visual cues. Alignment structures 630 provide a more precise passive alignment of optoelectronic components 505 to the optical pathway when integrated lens cover 510 is plugged into alignment frame 515.

Figure 8B:
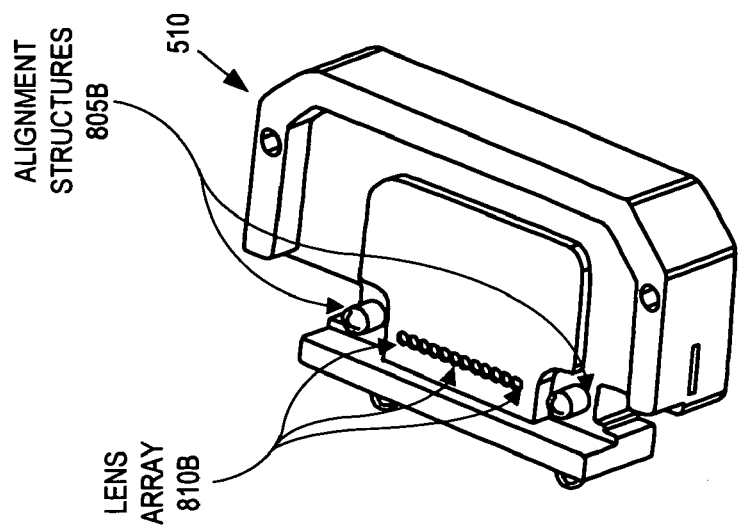
FIG. 8B is a perspective view of one side of an integrated lens cover including alignment structures for passive alignment, in accordance with an embodiment of the invention.
Figure 8A:
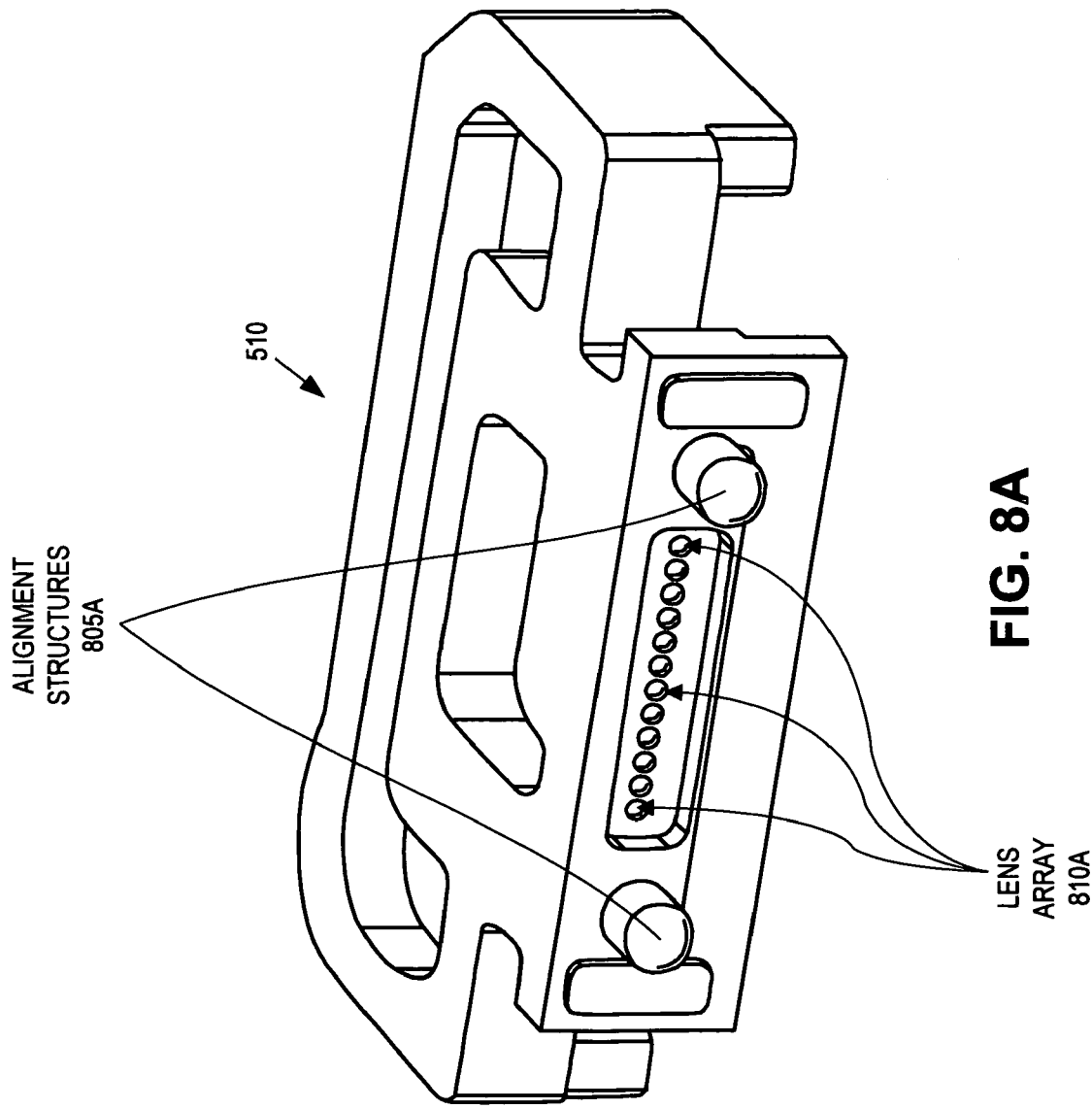
FIG. 8A is a perspective view of one side of an integrated lens cover including alignment structures for passive alignment, in accordance with an embodiment of the invention.
Figure 8C:
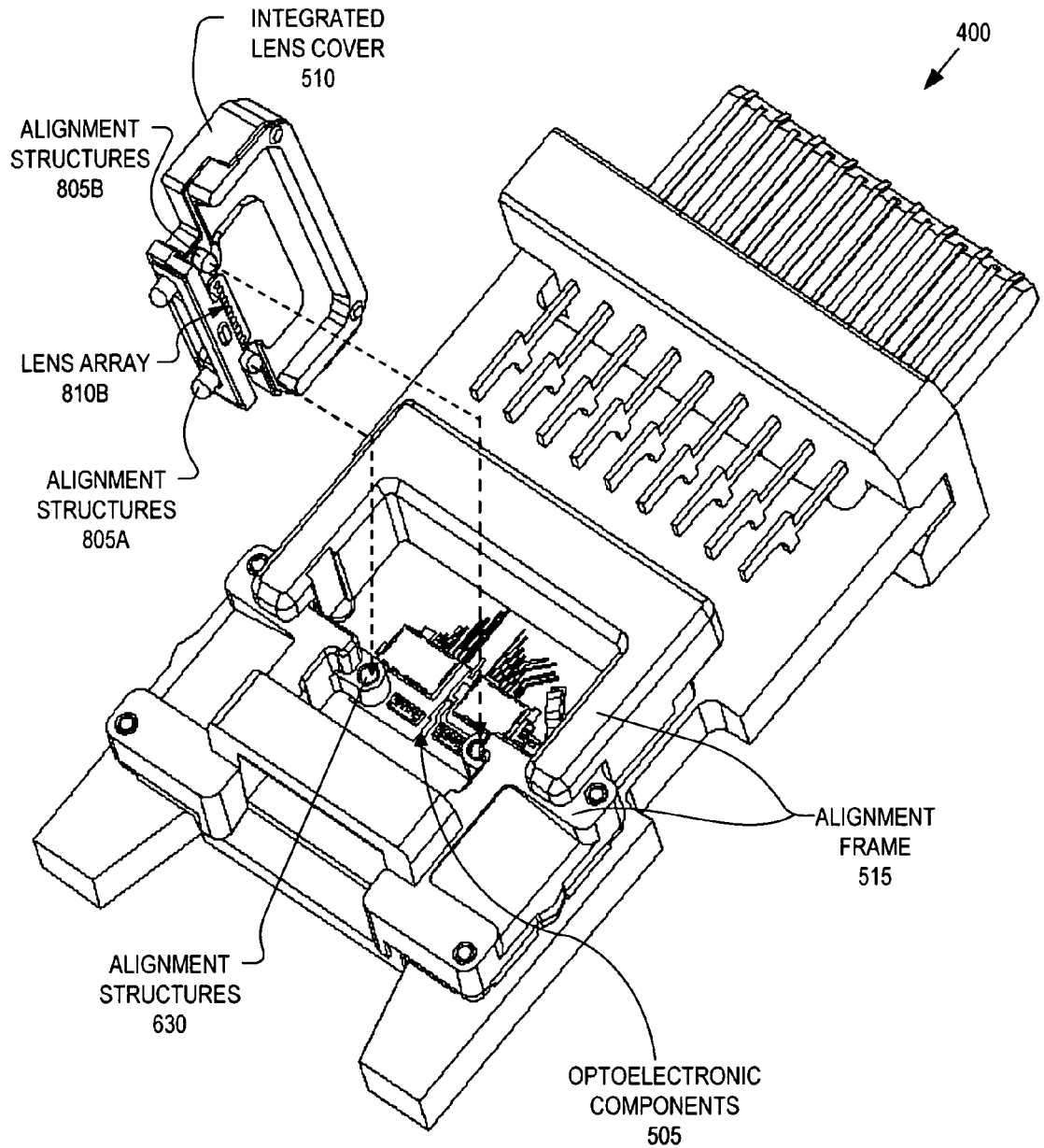
FIG. 8C is a perspective view illustrating how an integrated lens cover is passively aligned with optoelectronic components of a cable connector and protects the optoelectronic components from contamination, in accordance with an embodiment of the invention.

FIGS. 8A and 8B are perspective views of integrated lens cover 510 including alignment structures 805A and 805B (collectively 805) for passively aligning lens arrays 810A and 810B, in accordance with an embodiment of the invention. FIG. 8C is a perspective view illustrating how integrated lens cover 510 is passively aligned with optoelectronic components 505 of cable connector 400 and protects optoelectronic components 505 from contamination, in accordance with an embodiment of the invention. The actual shape and structure of integrated lens cover 510 may be a coarse passive alignment feature itself, allowing it to fit within the socket of alignment frame 515 (See FIG. 7).

The illustrated embodiment of integrated lens cover 510 depicts alignment structures 805A centrally aligned with lens array 810A and alignment structures 805B centrally aligned with lens array 810B. However, it should be appreciated that alignment structures 805 may be disposed anywhere on their respective planes. Alignment structures 805A mate with alignment structures disposed in cable coupler 525 to passively align lens array 810A with optical communication channels 535. Alignment structures 805B mate with alignment structures 630 to passively align lens array 810B with optical source array 615 and optical detector array 620. In short, alignment structures 805 provide a fine-tuned and more precise passive alignment of optoelectronic components 505 to the optical pathway and also of the optical pathway to optical communication channels 535 within communication cable 410.

Integrated lens cover 510 may further protect optoelectronic components 505 from contamination due to dust or other elements. It may also protect optoelectronic components 505 from physical stress or compression. The protection of integrated lens cover 510 also enables use of bare die optoelectronic components, thus reducing fabrication costs. Integrated lens cover 510 is one possible embodiment of integrated lens cover 215 illustrated in FIG. 2B. It should be appreciated that integrated lens cover 510 may take on a variety of different shapes and components.

Figure 9:
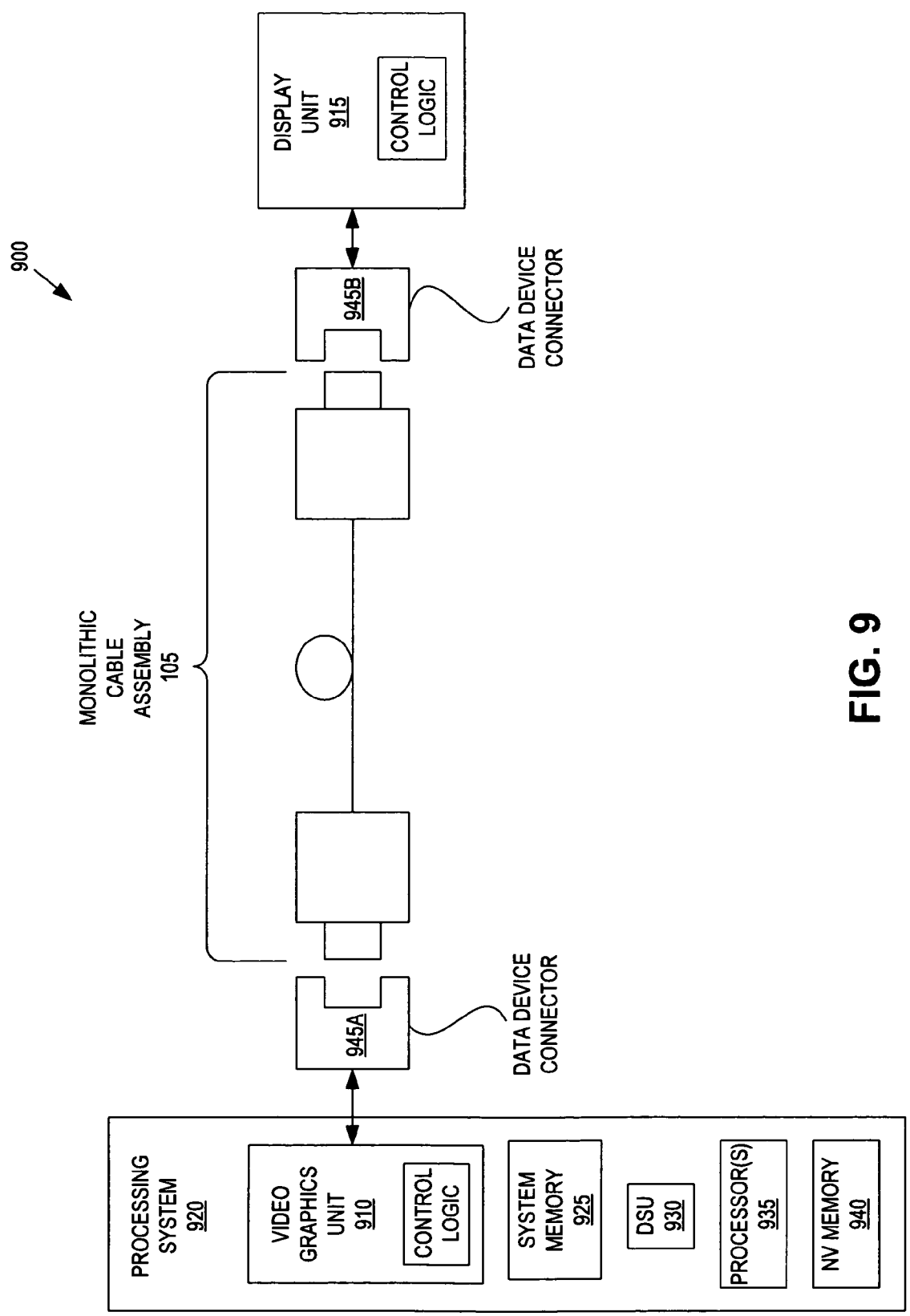
FIG. 9 is a demonstrative interconnect system implemented with a monolithic cable assembly, in accordance with an embodiment of the invention.

FIG. 9 is a demonstrative interconnect system 900 implemented with monolithic cable assembly 105, in accordance with an embodiment of the invention. The illustrated embodiment of system 900 includes a video graphics unit 910 (e.g., a video graphics card or the like) and a display unit 915 (e.g. a computer monitor, a television, or the like) coupled together by monolithic cable assembly 105. Video graphics unit 910 may be included within a processing system 920. The illustrated embodiment of processing system 920 includes system memory 925, a data storage unit ("DSU") 930, at least one processor 935, and nonvolatile ("NV") memory 940.

Video graphics unit 910 is coupled to a data device connector 945A and display unit 915 is coupled to a data device connector 945B. In one embodiment, data device connectors 945A and 945B (collectively 945) may be physically integrated into video graphics unit 910 and display unit 915, respectively, or externally coupled thereto. The illustrated embodiments of video graphics unit 910 and display unit 915 are embodiments of data devices 110.

Illustrated processing system 920 may represent any processing system including a desktop computer, a notebook computer, a workstation, a handheld computer, a server, a blade server, or the like. Processor(s) 935 is communicatively coupled to video graphics unit 910, system memory 925, DSU 930, and NV memory 940. In one embodiment, system memory 925 includes random access memory ("RAM"), such as dynamic RAM ("DRAM"), synchronous DRAM ("SDRAM"), double data rate SDRAM ("DDR" SDRAM), static RAM ("SRAM"), and the like. DSU 930 represents any storage device for software data, applications, and/or operating systems, but will most typically be a nonvolatile storage device. DSU 930 may optionally include one or more of an integrated drive electronic ("IDE") hard disk, an enhanced IDE ("EIDE") hard disk, a redundant array of independent disks ("RAID"), a SCSI hard disk, and the like. In one embodiment, NV memory is a flash memory device. In other embodiments, NV memory 940 includes any one of read only memory ("ROM"), programmable ROM, erasable programmable ROM ("EPROM"), electrically erasable programmable ROM ("EEPROM"), or the like.

Embodiments of interconnect system 900 may use monolithic cable assembly 105 to communicate data signals between video graphics unit 910 and display unit 915. Monolithic cable assembly 105 may enable video graphics unit 910 and display unit 915 to be separated by a large distance and still communicate data signals at high data rates without significant signal degradation in some embodiments. It should be appreciated that interconnect system 900 is just one embodiment of an interconnect system incorporating monolithic cable assembly 105. Other interconnect systems may be created using any of the applications and interconnects listed in Table 1 and any of the physical end connectors listed in Table 2.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus, comprising:
    a communication cable including at least one optical communication channel; and
    cable connectors coupled to either end of the communication cable, wherein the communication cable and the cable connectors form a monolithic cable assembly, each of the cable connectors including:
        a physical end connector for electrically coupling to a data device connector;
        optoelectronic components for converting data signals between an electrical realm and an optical realm; and
        a passively aligned integrated lens cover disposed over at least a portion of the optoelectronic components, the integrated lens cover including at least one optical pathway for coupling optical data signals between the at least one optical communication channel and the optoelectronic components, wherein the cable connectors to connect to a data device connector of a data device including a control logic to alter a communication protocol of signals generated by the data device, the signals altered based on whether the monolithic cable assembly including the optoelectronic components or an electrical cable assembly without active optoelectronic components is coupled to the data device connector, the data device not included in a transceiver or multiplexer to transmit or receive optical signals.

2. The apparatus of claim 1, wherein the physical end connector comprises a plug compliant with a CX4 Infiniband plug.

3. The apparatus of claim 1, wherein the physical end connector comprises a physical connector compliant with a connector selected from a group consisting of a CX12 connector, a Medium Dependent Interface ("MDI") connector, an XPAK Ethernet connector, a XENPAK Ethernet network physical access connector, an X2 connector, a MicroGiGaCN connector, a LaneLink connector, a Small Form-Factor Pluggable ("SFP") connector, an SFP Plus ("SFP+") connector, a 10 Gigabit Small Form-Factor Pluggable ("XFP") connector, a Quad Small Form-Factor Pluggable ("QSFP") connector, a Serial Advanced Technology Attachment ("SATA") connector, a Serial Attached Small Computer System Interface ("SAS") connector, a MiniSAS connector, a DisplayPort connector, a Unified Display Interface ("UDI") connector, a Registered Jack 45 ("RJ-45") connector, a 12 channel optical pluggable module multisource agreement (SNAP 12 MSA) connector, a 100 pin matrix array connector, an Optocube connector, and a coaxial cable connector.

4. The apparatus of claim 1, wherein the physical end connector includes an internal power pin to provide power to the optoelectronic components.

5. The apparatus of claim 4, wherein the internal power pin is configured to communicate electronic data signals modulated over a direct current ("DC") power signal.

6. The apparatus of claim 1, further comprising at least one electrical communication channel included within the communication cable, wherein the physical end connector of one of the cable connectors is coupled to provide power via the at least one electrical communication channel to the other one of the cable connectors.

7. The apparatus of claim 1, wherein the optoelectronic components include:
at least one optical source coupled to generate first optical data signals;
transmitter circuitry coupled to drive the at least one optical source in response to first electrical data signals;
at least one optical detector coupled to receive second optical data signals; and
receiver circuitry coupled to the at least one optical detector to output second electrical data signals in response to the at least one optical detector.

8. The apparatus of claim 7, wherein the transmitter circuitry includes a serializer to serialize two or more of the first electrical data signals for communication onto one or more optical waveguides, and wherein the receiver circuitry includes a deserializer.

9. The apparatus of claim 1, wherein at least one of the optoelectronic components is integrated as at least one bare die without a chip package passively aligned to a substrate, wherein the integrated lens cover protects the at least one bare die from contamination.

10. The apparatus of claim 1, further comprising:
an alignment frame including at least one socket and at least one alignment structure to passively align the at least one optical pathway to both the optoelectronic components and the at least one optical communication channel, wherein the at least one socket enables coarse passive alignment and the at least one alignment structure enables precise passive alignment.

11. The apparatus of claim 1, further comprising at least one reflector embedded within the integrated lens cover to couple the optical data signals between the at least one optical communication channel and the optoelectronic components.

12. The apparatus of claim 1, wherein the optoelectronic components include a plurality of optical sources physically integrated into a first monolithic array die, wherein the optoelectronic components further include a plurality of optical detectors physically integrated into a second monolithic array die.

13. A method, comprising:
using a control logic in a data device to alter a communication protocol of data signals generated by the data device, the signals altered based on whether a monolithic cable assembly including optoelectronic components or an electrical cable without optoelectronic components is coupled to a data device connector coupled to the data device, the data device not included in a transceiver or multiplexer to transmit or receive optical signals;
receiving first electrical data signals via the data device connector of the data device at a first cable connector of the monolithic cable assembly;
converting at least a portion of the electrical data signals into optical data signals via first optoelectronic components disposed within the first cable connector;
launching the optical data signals into at least one optical communication channel passively aligned with the first optoelectronic components;
guiding the optical data signals from the first cable connector to a second cable connector of the monolithic cable assembly via the at least one optical communication channel; and
converting the optical data signals to second electrical data signals via second optoelectronic components disposed within the second cable connector.

14. The method of claim 13, wherein the monolithic cable assembly is used for a data device application selected from a group consisting of a blade-to-blade interconnect, a chip-to-chip interconnect, a CPU-to-CPU interconnect, a CPU-to-memory interconnect, a CPU-to-graphics chip interconnect, an input/output ("I/O") interconnect, an optical backplane interconnect, a data acquisition application, a radio frequency ("RF") application, a Cable Television ("CATV") interconnect, an Ethernet interconnect, an Infiniband interconnect, a Myrinet interconnect, a QsNet interconnect, virtualization of multiple I/O streams applications, a serial advanced technology attachment ("SATA") interconnect, a serial attached small computer system interface ("SAS") interconnect, an Internet Small Computer System Interface ("iSCSI") interconnect, a Fibre Channel interconnect, an Advanced Switching Interconnect ("ASI"), a Peripheral Component Interconnect ("PCI") Express interconnect, a Common System Interface ("CSI") interconnect, and a HyperChannel interconnect.

15. The method of claim 13 wherein the electrical data signals and the optical data signals comprise analog signals.

16. The method of claim 13, wherein converting at least the portion of the electrical data signals into the optical data signals comprises converting a first portion of the electrical data signals into the optical data signals, the method further comprising:
communicating a second portion of the electrical data signals from the first cable connector to the second cable connector of the monolithic cable assembly via at least one electrical communication channel.

17. The method of claim 16, wherein the second portion of the electrical data signals comprises one of slow-speed electrical signals relative to the first portion or clock signals.

18. The method of claim 13, further comprising determining whether an electrical cable assembly or an optical cable assembly is coupled to a data device connector.

19. The method of claim 18, further comprising:
generating the first electrical data signals based on a first communication protocol, if the electrical cable assembly is coupled to the data device connector; and
generating the first electrical data signals based on a second communication protocol, if the optical cable assembly is coupled to the data device connector.

20. The method of claim 13, further comprising providing power to the first cable connector via a pin within a physical end connector of the first cable connector to power the first optoelectronic components.

21. A system, comprising:
a communication cable including at least one optical communication channel; cable connectors coupled to either end of the communication cable, wherein the communication cable and the cable connectors form an active optical monolithic cable assembly; and a first device embedded within a processing system and coupled to one of the cable connectors, wherein the first device is configured to generate first electrical data signals to be transmitted over the active optical monolithic cable assembly, the first electrical data signals to be based on a first communication protocol, if a control logic in the first device determines that the electrical cable assembly is coupled to the first device, else to generate the first electrical data signals based on a second communication protocol, if the control logic determines that the optical cable assembly is coupled to the first device, wherein the first device is not included in a transceiver or multiplexer to receive or transmit optical signals.

22. The system of claim 21, wherein each of the cable connectors includes:
a physical end connector for electrically coupling to a data device connector;
optoelectronic components for converting data signals between an electrical realm and an optical realm; and
a passively aligned integrated lens cover disposed over at least a portion of the optoelectronic components, the integrated lens cover including at least one optical lens for coupling optical signals between the at least one optical communication channel and the optoelectronic components.

23. The system of claim 21, wherein the first device comprises a video graphics unit, the system further comprising a display unit coupled to the other one of the cable connectors.

24. The system of claim 23, wherein the physical end connector of the one of the cable connectors coupled to the video graphics unit includes a pin to provide power to the optoelectronic components.

25. The system of claim 21, wherein the physical end connector comprises a physical connector compliant with a connector selected from a group consisting of a CX4 connector, a CX12 connector, a Medium Dependent Interface ("MDI") connector, an XPAK Ethernet connector, a XENPAK Ethernet network physical access connector, an X2 connector, a MicroGiGaCN connector, a LaneLink connector, a Small Form-Factor Pluggable ("SFP") connector, an SFP Plus ("SFP+") connector, a 10 Gigabit Small Form-Factor Pluggable ("XFP") connector, a Quad Small Form-Factor Pluggable ("QSFP") connector, a Serial Advanced Technology Attachment ("SATA") connector, a Serial Attached SCSI ("SAS") connector, a MiniSAS connector, a DisplayPort connector, a Unified Display Interface ("UDI") connector, a Registered Jack 45 ("RJ-45") connector, a 12 channel optical pluggable module multi-source agreement (SNAP 12 MSA) connector, a 100 pin matrix array connector, an Optocube connector, and a coaxial cable connector.

* * * * *